United States Patent [19]

Silcox

[11] Patent Number: 4,725,174
[45] Date of Patent: Feb. 16, 1988

[54] TRIPLE REDUNDANT SHEAR BOLT

[75] Inventor: Robert B. Silcox, Farmington, Conn.

[73] Assignee: United Technologies Corporation, Hartford, Conn.

[21] Appl. No.: 65,119

[22] Filed: Jun. 29, 1987

Related U.S. Application Data

[63] Continuation of Ser. No. 774,217, Sep. 9, 1985, abandoned.

[51] Int. Cl.$^4$ .............................................. F16B 39/22
[52] U.S. Cl. .................................... 411/296; 411/318; 411/347
[58] Field of Search .................... 411/197–199, 411/209–211, 296–299, 316–318, 347, 348

[56] References Cited

U.S. PATENT DOCUMENTS

| | | | |
|---|---|---|---|
| 899,940 | 9/1908 | Barron | 411/199 |
| 1,083,919 | 1/1914 | Chesher | 411/296 X |
| 1,210,669 | 1/1917 | Mike et al. | 411/211 |
| 1,639,211 | 8/1927 | Campo | 411/318 |
| 2,193,175 | 3/1940 | Kozub | 411/348 X |
| 2,382,166 | 8/1945 | Martin | 411/347 |
| 2,426,099 | 8/1947 | Hershowitz | 411/347 X |

FOREIGN PATENT DOCUMENTS

| | | | |
|---|---|---|---|
| 877973 | 9/1942 | France | 411/317 |
| 152318 | 4/1932 | Switzerland | 411/348 |
| 7349 | of 1890 | United Kingdom | 411/318 |

Primary Examiner—Lloyd A. Gall
Attorney, Agent, or Firm—Harry J. Gwinnell; Andrew N. Parfomak

[57] ABSTRACT

A bolt is provided with a radial, spring-loaded pawl, and an associated nut is provided with cooperating detents on its inner diameter that cooperate with the pawl so that the nut does not back off the bolt. The nut is also castellated for insertion of a cotter pin through the bolt so that the nut is further restrained from backing off. In the event that the nut backs off, the pawl prevents the bolt from pulling out of a close tolerance hole, such as a rod end fitting.

4 Claims, 5 Drawing Figures

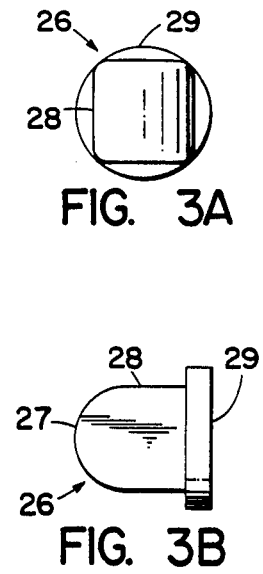
FIG. 3A
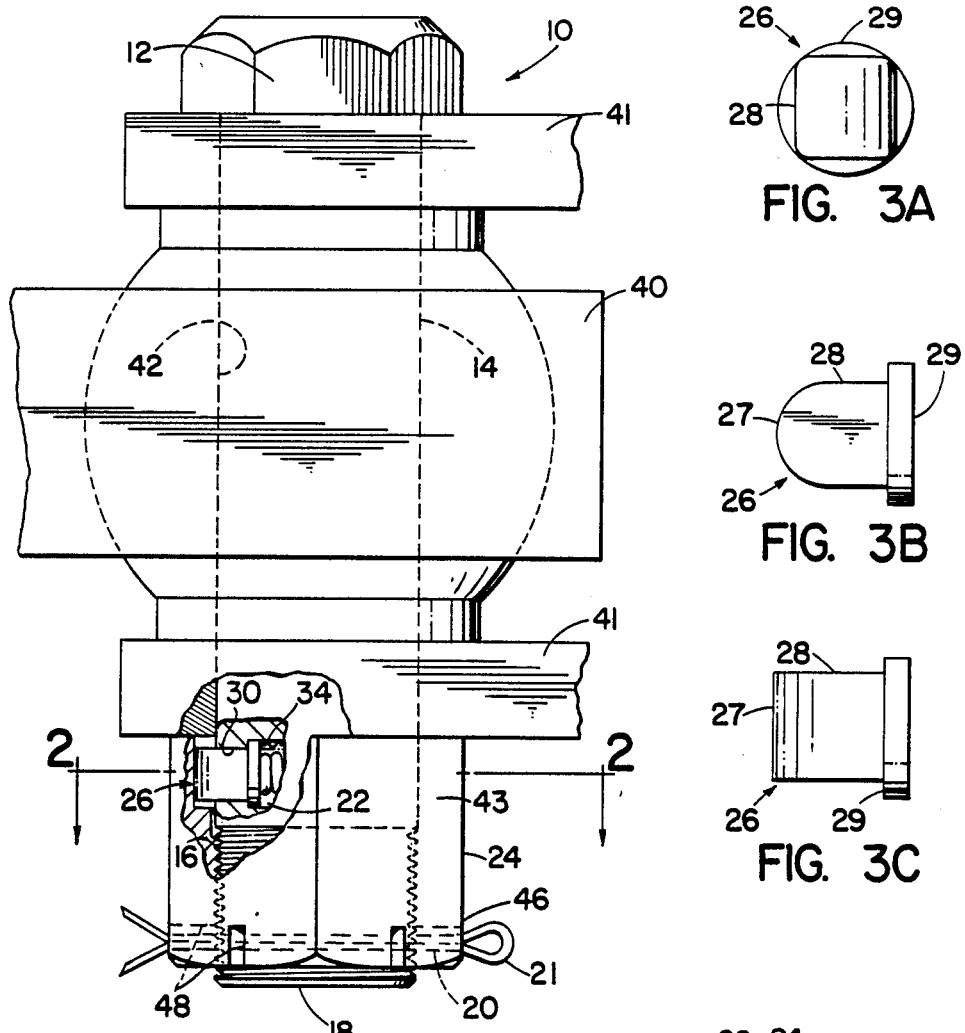
FIG. 3B
FIG. 3C
FIG. 1
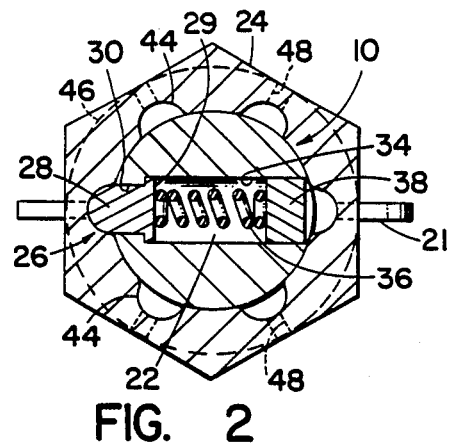
FIG. 2

TRIPLE REDUNDANT SHEAR BOLT

This is a continuation application of Ser. No. 774,217, filed on Sept. 9, 1985, now abandoned.

TECHNICAL FIELD OF THE INVENTION

The invention relates to fasteners and, more particularly, to those with positive lock features.

BACKGROUND OF THE INVENTION

In aircraft control system applications, a nut backing off, and subsequent loss of the bolt, is not acceptable. Therefore, it is typical to provide a hole in the bolt shank, near the end of the threads, so that a cotter pin can be inserted through a castellated (slotted) nut in order to prevent the nut from backing off.

Failure to insert the cotter pin during maintenance can create a safety hazard. Therefore, it is known to provide self-retaining bolts. These bolts have an axial, spring-loaded cam-plunger acting on a ball protruding from the shank (much like the renowned Sears' socket wrench). When the plunger is depressed, the ball can move radially within the shank so that the bolt can be inserted through a close tolerance hole, such as the hole in a control rod end fitting. When the plunger is released, the ball protrudes beyond the shank on the other side of the fitting from the bolt head so that the ball prevents the bolt from coming out of the hole if the nut backs off. However, the hollow shank required to accommodate the plunger creates a noninspectable, corrosion-prone bolt. This is especially pertinent in a salt water spray environment.

DISCLOSURE OF THE INVENTION

It is an object of this invention to provide a self-retaining bolt without a hollow shank.

According to the invention a bolt is provided with a radial, spring-loaded pawl, and an associated nut is provided with detents on its inner diameter that cooperate with the pawl so that the nut does not back off the bolt. The nut is also castellated for insertion of a cotter pin through the bolt so that the nut is further restrained from backing off. In the event that the nut backs off, the pawl prevents the bolt from pulling out of a close tolerance hole, such as a rod end fitting.

Other objects, features and advantages of the invention will become apparent in light of the following description thereof.

BRIEF DESCRIPTION OF THE DRAWINGS

FIG. 1 is a side view of the bolt of this invention.
FIG. 2 is a view of the bolt taken through the section 2—2 of FIG. 1, including a nut.
FIG. 3A shows an end view of the pawl.
FIG. 3B shows a first side view of the pawl.
FIG. 3C shows a second sisde view of the pawl.

BEST MODE FOR CARRYING OUT THE INVENTION

FIG. 1 shows the bolt 10 of this invention. The bolt 10 comprises a head 12 and a shank 14. A portion 16 of the shank 14 opposite the head 12 is threaded to receive a nut. Near the tip end 18 of the shank 14 a hole 20 is provided perpendicular to the bolt axis for receiving a cotter pin 21. Just beyond the bolt head end of the threaded portion 16 another hole 22 is provided in the shank 14 perpendicular to the bolt axis, preferably parallel to the cotter pin hole 20.

The hole 22 is best viewed in FIG. 2, which shows a section of the bolt 10, and associated nut 24 taken through the section 2—2 of FIG. 1. The hole 22 is "stepped" to receive and retain a pawl 26. The pawl 26 has a tip 27, a head 28, and a base 29. The head 28 is of a first cross-sectional dimension corresponding to a portion 30 of the hole 22, and the base 29 is of a second cross-sectional dimension, larger than the first dimension, corresponding to a portion 34 of the hole 22. Details of the pawl 26 are shown in FIG. 3. The junction of the hole portions 30 and 34 defines the aforementioned "step" so that the pawl may be inserted "tip first" into the portion 34 of the hole 22, perpendicularly through the bolt 10 until further insertion is prevented by the step. At this point, the tip of the pawl protrudes beyond the shank of the bolt.

A spring 36 is inserted into the hole portion 34 behind the base of the pawl so as to exert force thereon that causes the pawl tip to protrude radially from the bolt shank. The spring 36 is retained within the hole portion 34 of the bolt shank by a plug 38 that is press-fitted and staked within the hole 22, opposite the pawl head 28.

FIG. 3 shows three views of the pawl 26. In an end view (A), it is apparent that the head 28 of the pawl 26 is essentially square in cross section. Thus the portion 30 of the hole 22 is square to receive the pawl head 28 and prevent its rotation. In a first side view (B), corresponding to the perspective of FIG. 2, it is apparent that two opposite sides of the pawl tip 27 are fully radiused. In a second side view (C), taken perpendicular to the bolt axis and the hole 22 axis, it is apparent that the upper and lower surfaces of the pawl tip 27 are simply flat, and in alignment with the square pawl head surfaces.

FIG. 1 shows a rod end fitting 40/clevis 41 receiving the bolt 10. To insert the bolt 10 into the rod end fitting 40/clevis 41 the pawl is depressed manually into the shank during initial insertion. During further insertion, the pawl is caused to be held within the shank by the inside surface 42 of the fitting. Upon full insertion of the bolt 10 into the fitting 40, the pawl is no longer within the fitting and its tip protrudes from the bolt shank as urged by the spring 36. The flat upper surface of the pawl tip 27 retains the bolt within the fitting. It is important that the pawl head and applicable hole portions be shaped (square in this illustration) to prevent rotation of the pawl within the bolt. This restriction of the pawl allows a flat surface of its tip portion to contact and bear against the surface of the parts to be retained (the fitting in this illustration) in the event of loss of the nut. The extended pawl will act as a stop and perform its retention function.

Returning to FIG. 2, it will be noted that the inside diameter of the bolt-head-facing portion 43 of the nut 24 is provided with six equally spaced radiused detents 44, corresponding to the radiused pawl head and sized so as to receive the protruding tip of the extended pawl head. The pawl tip presents a rounded surface so as to allow its extension into and out of the nut detents as the nut is advanced toward contact with the fitting. In the absence of applying torque (wrenching force) to the nut the extended pawl will prevent the nut from backing off. The portion 46 of the nut away from the bolt head is provided with conventional castellations (slots) 48 aligned with the hole 20 and insertion of the cotter pin 21 therethrough as an additional means of preventing the nut from backing off the bolt. The parallel alignment of the detents and nut castellations provide for full extension of the spring biased pawl into a detent simultaneously with the retention action of the cotter pin. It is desirable that the pawl be already in an action position for retention in the event of loss of the cotter pin. In the event of a pawl jam, it is desirable for the pawl to be in its extended position in the detent rather than in a compressed position between detents.

Thus, the "triple-redundancy" of the bolt of this invention resides in the cotter pin preventing nut backoff, the pawl preventing nut backoff and the pawl providing self-retention for the bolt in the event of nut backoff.

Numerous deviations and alternatives are available to the designers within the teachings of this invention. For example, while a drilled stopper hole has been described and illustrated, it may be economically desirable to create a step by insertion of a bushing in one end of a constant diameter hole in the bolt shank. Likewise, in place of separate elements comprising a pawl, spring and plug, it may be desirable to utilize an assembly comprising a tubular insert. Further, other shapes than square may be used for prevention of pawl rotation. Also, while the aforementioned description mentions use of this invention for close tolerance hole applications it should be recognized that in certain very close dimensioned fits between bolt shank and fittings, it may be possible to use a spherical shaped pawl tip and attendant circular pawl head, which can be allowed to rotate. The complexity of the pawl shape is a function of the application and should not be considered a limitation of this invention.

The perpendicular hole 22 of this invention provides superior corrosion resistance to the longitudinal hole of the prior art, especially in light of the nut 24 completely covering the hole 22 when assembled.

I claim as my invention:

1. A fastener for insertion through a close tolerance hole in a fitting, comprising:
   a bolt having a head and a shank, a portion of the shank away from the head being threaded;
   a first hole provided radially through the shank perpendicular to the bolt axis including a first hole portion of a first cross-sectional dimension extending to the surface of the shank and a second hole portion of a second cross-sectional dimension greater than the first hole portion extending to the diametrically opposed surface of the shank, wherein the junction of the first hole portion and the second hole portion forms a step;
   a pawl having a head corresponding in end cross section to the first dimension disposed within the first hole portion, having a tip protruding outside the surface of the shank, and having a base corresponding in end cross-section to the second dimension disposed within the second hole portion;
   a spring disposed behind the base of the pawl so as to exert a pawl-protruding force on the pawl;
   a plug fixed within the diametrically opposed surface of the shank in the second hole portion to retain the spring within the shank;
   a second hole provided through the threaded portion of the bolt perpendicular to the bolt axis; and
   a nut provided with an inner surface wherein a first portion of said inner surface is threaded so to engage the threaded portion of the bolt shank, and a second portion of said inner surface which is not threaded and provided with detents corresponding to and receiving the protruding pawl tip, and castellations on the nut for receiving a cotter pin through the second hole, so that
   the pawl restricts the bolt from pulling out of the fitting, cooperation between the pawl and the detents resists nut backoff and nut backoff is further resisted by cooperation between the second hole, the cotter pin and the castellations.

2. A fastener according to claim 1 wherein the pawl head is square in end cross section and the two opposite sides of the pawl tip are fully radiused so that insertion of the nut over the pawl is facilitated thereby.

3. A fastener according to claim 2 wherein the upper and lower surfaces of the pawl tip are flat.

4. A fastener according to claim 2 wherein the first hole is square in cross section to receive and prevent the pawl from rotating.

* * * * *